US011468357B2

(12) United States Patent
Johnson et al.

(10) Patent No.: US 11,468,357 B2
(45) Date of Patent: Oct. 11, 2022

(54) HYBRID QUANTUM-CLASSICAL COMPUTER FOR PACKING BITS INTO QUBITS FOR QUANTUM OPTIMIZATION ALGORITHMS

(71) Applicant: Zapata Computing, Inc., Boston, MA (US)

(72) Inventors: Peter D. Johnson, Somerville, MA (US); Maria Kieferova, Waterloo (CA); Max Radin, Cambridge, MA (US)

(73) Assignee: Zapata Computing, Inc., Boston, MA (US)

(*) Notice: Subject to any disclaimer, the term of this patent is extended or adjusted under 35 U.S.C. 154(b) by 491 days.

(21) Appl. No.: 16/691,015

(22) Filed: Nov. 21, 2019

(65) Prior Publication Data

US 2020/0160204 A1 May 21, 2020

Related U.S. Application Data

(60) Provisional application No. 62/770,535, filed on Nov. 21, 2018.

(51) Int. Cl.
*G06N 10/00* (2022.01)
*G06F 17/14* (2006.01)

(52) U.S. Cl.
CPC ............ *G06N 10/00* (2019.01); *G06F 17/14* (2013.01)

(58) Field of Classification Search
CPC ........ G06N 10/00; G06N 10/20; G06N 10/40; G06N 10/60; G06N 10/70; G06N 10/80
USPC .............................. 706/16, 17, 18, 19, 20, 21
See application file for complete search history.

(56) References Cited

U.S. PATENT DOCUMENTS

| 9,152,746 | B2 | 10/2015 | Troyer |
| 10,133,984 | B2* | 11/2018 | Clarke ................... G06N 10/00 |
| 10,452,989 | B2* | 10/2019 | Majumdar .......... G06F 9/45504 |
| 2007/0239366 | A1 | 10/2007 | Hilton et al. |
| 2015/0006443 | A1 | 1/2015 | Rose |
| 2016/0283857 | A1 | 9/2016 | Babbush |
| 2016/0328253 | A1 | 11/2016 | Majumdar |
| 2017/0091649 | A1 | 3/2017 | Clarke et al. |

(Continued)

FOREIGN PATENT DOCUMENTS

| KR | 20180004226 A | 1/2018 |
| KR | 20180022925 A | 3/2018 |
| WO | 2005093649 A1 | 10/2005 |

(Continued)

OTHER PUBLICATIONS

Anschuetz, E.R., et al., "Variational Quantum factoring," Quantum Technology and Optimization Problems, arXiv preprint arXiv:1808.08927, pp. 1-18 (Aug. 27, 2018).

(Continued)

*Primary Examiner* — Hai L Nguyen
(74) *Attorney, Agent, or Firm* — Blueshift IP, LLC; Robert Plotkin

(57) ABSTRACT

A hybrid quantum classical (HQC) computer, which includes both a classical computer component and a quantum computer component, implements improvements to the quantum approximate optimization algorithm (QAOA) which enable QAOA to be applied to valuable problem instances (e.g., those including several thousand or more qubits) using near-term quantum computers.

34 Claims, 11 Drawing Sheets

(56) References Cited

U.S. PATENT DOCUMENTS

2018/0260245 A1  9/2018  Smith
2020/0005186 A1  1/2020  Romero et al.

FOREIGN PATENT DOCUMENTS

| WO | 2017031356 | A1 | 2/2017 |
| WO | 2017116446 | A1 | 7/2017 |
| WO | 2017214717 | A1 | 12/2017 |
| WO | 2020010147 | | 1/2020 |
| WO | 2020037300 | | 2/2020 |
| WO | 2020106955 | A1 | 5/2020 |
| WO | 2021055507 | A1 | 3/2021 |

OTHER PUBLICATIONS

Calderbank, A.R., et al., "A group-theoretic framework for the construction of packings in grassmannian spaces," Journal of Algebraic Combinatorics, vol. 9, No. 2, pp. 129-140 (1999).

Chao, R., et al., "Overlapping qubits," Quantum Physics, arXiv:1701.01062v1, pp. 1-22 (Jan. 4, 2017).

Crooks, G.E., "Performance of the Quantum Approximate Optimization Algorithm on the Maximum Cut Problem," Quantum Physics, arXiv:1811.08419v1, pp. 1-6 (Nov. 20, 2018).

Farhi, E., et al., "A quantum approximate optimization algorithm," Quantum Physics arXiv:1411.4028v1, pp. 1-16 (Nov. 14, 2014).

Shor, P.W., and Sloane, N.J.A., "A family of optimal packings in grassmannian manifolds," Journal of Algebraic Combinatorics, vol. 7, No. 2, pp. 157-163 (1998).

International Search Report & Written Opinion dated Mar. 12, 2020 in International patent application No. PCT/US2019/062612, 7 pages.

Goemans, M.X., and Williamson, D.P., "Improved approximation algorithms for maximum cut and satisfiability problems using semidefinite programming," Journal of the ACM (JACM), vol. 42, No. 6, pp. 1115-1145 (Nov. 1995).

Johnson, W.B., and Lindenstrauss, J., "Extensions of Lipschitz mappings into a Hilbert space," Contemporary mathematics, vol. 26, No. 1, pp. 189-206 (Jan. 1984).

Karp, R.M., "Reducibility among combinatorial problems," Complexity of computer computations, pp. 85-103 (1972).

Khot, S., "On the power of unique 2-prover 1-round games," Proceedings of the thiry-fourth annual ACM symposium on Theory of computing, pp. 767-775 (May 2002).

Pichler, H., et al., "Quantum optimization for maximum independent set using rydberg atom arrays," arXiv:1808.10816v1, pp. 1-13 (Aug. 31, 2018).

Trevisan, L., et al., "Gadgets, approximation, and linear programming," SIAM Journal on Computing, vol. 29, No. 6, pp. 2074-2097 (2000).

International Search Report & Written Opinion dated Dec. 30, 2020, in international patent application No. PCT/US2020/051115, 9 pages.

Jozsa, R., et al., "Matchgates and classical simulation of quantum circuits," Proceedings of the Royal Society A: Mathematical, Physical and Engineering Science, 464 (2100):3089-310J., 6, pp. 1-18 (2008).

McClean, J.R., et al., "Barren plateaus in quantum neural network training landscapes," Nature communications, arXiv:1803.11173, pp. 1-6 (2018).

Preskill, J., "Quantum Computing in the NISQ era and beyond", arXiv preprint arXiv:1801.00862v3, pp. 1-20 (Jul. 31, 2018).

Ramelow, S., et al., "Matchgate quantum computing and non-local process analysis," arXiv:0909.3016v1, pp. 1-11 (2011).

Wan, K. H., et al., "Quantum generalisation of feedforward neural networks", npj Quantum Information, vol. 3, Article No. 36, arXiv:1612.01045, pp. 1-8 (2017).

Lamata, L., et al., "Quantum autoencoders via quantum adders with genetic algorithms," arXiv:1709.07409 [quant-ph], pp. 1-8 (2018).

International Search Report and Written Opinion dated Oct. 23, 2019 by the Korean Intellectual Property Office in International patent application No. PCT/US2019/040406, 8 pages.

International Search Report and Written Opinion dated Jan. 29, 2020, in International Patent Application No. PCT/US2019/046964, 11 pages.

McCaskey, A., et al., "Validating Quantum-Classical Programming Models with Tensor Network Simulations," arXiv:1807.07914v1, pp. 1-11 [retrieved on Jan. 20, 2020]. Retrieved from https://arxiv.org/abs/1807.07914v1 (Jul. 20, 2018).

Biamonte, J.D., "Quantum Machine Learning Matrix Product States," arXiv:1804.02398v1, Apr. 6, 2018, 9 pages. [retrieved on Jan. 20, 2020], Retrieved from<https://arxiv.org/abs/1804.02398v1>.

Romero et al., "Quantum autoencoders for efficient compression of quantum data", arXiv:1612.02806v2, Feb. 10, 2017, 11 pages. . [retrieved on Jan. 20, 2020]. Retrieved from <https://arxiv.org/abs/1612.02806>.

Bruognolo, "Tensor network techniques for strongly correlated systems: Simulating the quantum many-body wavefunction in zero, one, and two dimensions," LMU PhD Thesis, Jul. 6, 2017, 98 pages, retrieved on Jan. 20, 2020]. Retrieved from <https://www.theorie.physik.uni-muenchen.de/lsvondelft/publications/phd/index.html>.

McClean, J. R., et al., "Barren plateaus in quantum neural network training landscapes", Nature Communications, vol. 9, pp. 1-6, 2018.

Romero, J., et al., "Quantum autoencoders for efficient compression of quantum data", Quantum Science and Technology, vol. 2 (4):045001, Feb. 10, 2017, pp. 1-10.

Kivlichan, I.D. et al., "Quantum simulation of electronic structure with linear depth and connectivity," Physical Review Letters, 120(11):110501, 2018, pp. 1-8 (2018).

\* cited by examiner

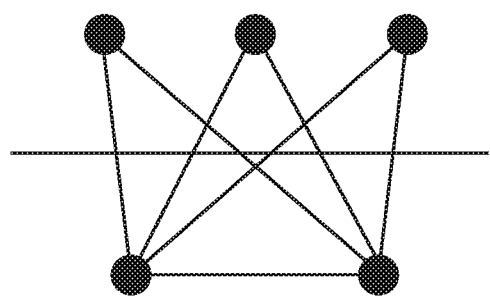
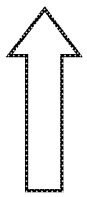
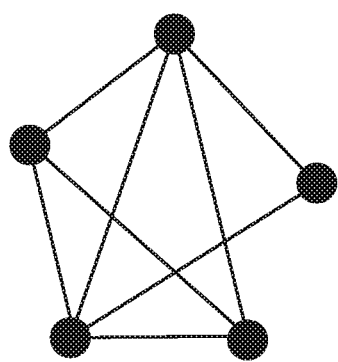
FIG. 4

Defining the packed MAXCUT Hamiltonian

1. $M$ "packed" bits

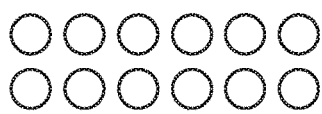

2. $N$ "host" qubits

$\left.\begin{array}{l}\gamma_j = Z_1...Z_{j-1}X_j \\ \gamma_{j+N} = Z_1...Z_{j-1}Y_j\end{array}\right\}$ Majorana operators 3. Packing $2M$ almost-orthogonal rays in $2N$ real dimensions

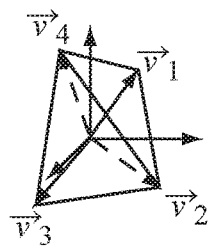
   $V = \begin{bmatrix} -\vec{v}_1- \\ -\vec{v}_2- \\ -\vec{v}_3- \\ -\vec{v}_4- \end{bmatrix}$ 4. Constructing $2M$ almost-anti-commuting Majoranas with $2N$ Majoranas $$\tilde{\gamma}_i = \sum_{j=1}^{2N} V_i^j \gamma_j$$

$$\{\tilde{\gamma}_i, \tilde{\gamma}_j\} = \left(\sum_{j=1}^{2N} V_i^k V_j^k\right) I = (\delta_{ij} + O(\epsilon))I$$

5. Packing $M$ almost-independent bits in $N$ qubits

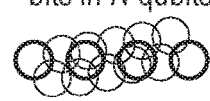

$$\tilde{Z}_i = i\tilde{\gamma}_i(\alpha_i\tilde{\gamma}_{i+M} + \beta_i\tilde{\gamma}_i)$$

6. Packed QAOA Hamiltonian $$H = -\sum_{ij} A_{ij}\tilde{Z}_i\tilde{Z}_j$$

$$= \sum_{ij} A_{ij}\tilde{\gamma}_i\tilde{\gamma}_{i+M}\tilde{\gamma}_j\tilde{\gamma}_{j+M}$$

$$= \sum_{ii}^{M} \sum_{abcd}^{2N} A_{ij} V_a^i V_b^{i+M} V_c^j V_d^{j+M} \gamma_a\gamma_b\gamma_c\gamma_d$$

FIG. 5

**Flowchart demonstrating variational quantum eigensolver
and classical rounding steps of the bit packing protocol for MAXCUT.**

Running VQE for packed MAXCUT Hamiltonian

7. Start with 2-body Majorana Fermion Hamiltonian $$H = \sum_{abcd}^{2N} h_{abcd} \gamma_a \gamma_b \gamma_c \gamma_d$$

8. VQE: Tune circuit ansatz to minimize estimated energy expectation value $$\min_{\vec{\theta}} \langle 0^N | U(\vec{\theta})^\dagger H U(\vec{\theta}) | 0^N \rangle$$

9. Reconstruct MAXCUT parity expectation values $$\langle \tilde{Z}_i \tilde{Z}_j \rangle = \sum_{abcd}^{2N} V_a^i V_b^{i+M} V_c^j V_d^{j+M} \langle \gamma_a \gamma_b \gamma_c \gamma_d \rangle$$

Generating MAXCUT assignments from marginal data

10. Construct positive semidefinite matrix from marginal data matrix $$\mu_{ij} = \langle \tilde{Z}_i \tilde{Z}_j \rangle$$
$$\bar{\mu} = \mu - \lambda_{\min} I$$

11. Generate Gaussian samples using as a covariance matrix $\bar{\mu}$ $$\vec{x} \sim \mathcal{N}(0, \bar{\mu})$$

12. Round to generate candidate Maxcut assignments $$z_i = sign(x_i)$$

FIG. 6

HYBRID QUANTUM-CLASSICAL COMPUTER FOR PACKING BITS INTO QUBITS FOR QUANTUM OPTIMIZATION ALGORITHMS

BACKGROUND

Quantum computers promise to solve industry-critical problems which are otherwise unsolvable. Key application areas include chemistry and materials, bioscience and bioinformatics, and finance. Interest in quantum computing has recently surged, in part, due to a wave of advances in the performance of ready-to-use quantum computers.

The quantum approximate optimization algorithm (QAOA) is a quantum algorithm for obtaining approximate solutions to certain combinatorial optimization problems. With the standard approach to QAOA, prospects for outperforming state-of-the-art classical methods are low. The standard approach requires at least one qubit for each Boolean variable or for each node in the graph. However, the number of qubits expected to be available in the near term (several hundred) is far too few to accommodate valuable problem instances (requiring several thousand) (see, e.g., Gavin E. Crooks, "Performance of the Quantum Approximate Optimization Algorithm on the Maximum Cut Problem," arXiv preprint arXiv:1811.08419, 2018).

[2.5] Other optimization problems, such as the variational quantum eigensolvers (VQE), also require the use of many qubits to solve useful problem instances.

What is needed, therefore, are techniques for applying QAOA or VQE to valuable problem instances using near-term quantum computers. Such improvements would have a wide variety of applications in science and engineering.

SUMMARY

A hybrid quantum classical (HQC) computer, which includes both a classical computer component and a quantum computer component, implements improvements to the quantum approximate optimization algorithm (QAOA) and other variational quantum algorithms which enable these algorithms to be applied to valuable problem instances (e.g., those including several thousand or more qubits) using near-term quantum computers.

In one aspect, a method for reducing the number of qubits with which an operator is represented on a quantum computer comprises: (1) receiving, as input, at a classical computer, an N-qubit operator; (2) decomposing, at the classical computer, the N-qubit operator as a linear combination of products of Majorana operators on 2N Majorana modes; and (3) forming, at the classical computer, a second operator, representable on M qubits, based on a linear transformation of the Majorana operators of the N-qubit operator, wherein the linear transformation is from $R^{(2N)}$ to $R^{(2M)}$, wherein M<N.

The method may further include: (4) at the quantum computer, generating marginal expectation values from the packed operator; and (5) at the classical computer, using the marginal expectation values to generate approximate marginals by approximating an expectation value of the operator. The input operator may include an Ising Hamiltonian. The method may further include: (6) generating bit string samples based on the approximate marginals; or (6) generating bit string samples based on the approximate marginals. Generating the bit string samples may include generating the bit string samples by generating samples and then rounding. Generating the bit string samples may include generating the bit string samples using direct rounding.

Forming the second operator based on the linear transformation may include performing a packing of 2-planes. Performing the packing of 2-planes may include performing skew-symmetric conference matrices. Performing the packing of 2-planes may include performing numerically-generated semidefinite programming packings.

The input operator may include a fermionic Hamiltonian. The input operator may include an ising Hamiltonian. The linear transformation may include a stochastic transformation. The stochastic transformation may include a Johnson-Lindenstrauss transformation.

The linear transformation may include an explicit transformation. The explicit transformation may include Hadamard codes. The explicit transformation may include symmetric conference matrices.

In another aspect, a system includes: a classical computer including a processor, a non-transitory computer-readable medium, and computer program instructions stored in the non-transitory computer-readable medium; a quantum computer comprising a plurality of qubits; wherein the computer program instructions, when executed by the processor, perform a method for reducing the number of qubits with which an operator is represented on the quantum computer. The method includes: (1) receiving, as input, at a classical computer, an N-qubit operator; (2) decomposing, at the classical computer, the N-qubit operator as a linear combination of products of Majorana operators on 2N Majorana modes; and (3) forming, at the classical computer, a second operator, representable on M qubits, based on a linear transformation of the Majorana operators of the N-qubit operator, wherein the linear transformation is from $R^{(2N)}$ to R (2M), wherein M<N.

Other features and advantages of various aspects and embodiments of the present invention will become apparent from the following description and from the claims.

BRIEF DESCRIPTION OF THE DRAWINGS

FIG. 4 shows an example MAXCUT instance and its solution according to one embodiment of the present invention;

FIGS. 5 and 6 illustrate additional details of the method of FIG. 7 according to one embodiment of the present invention;

DETAILED DESCRIPTION

Figure 1:
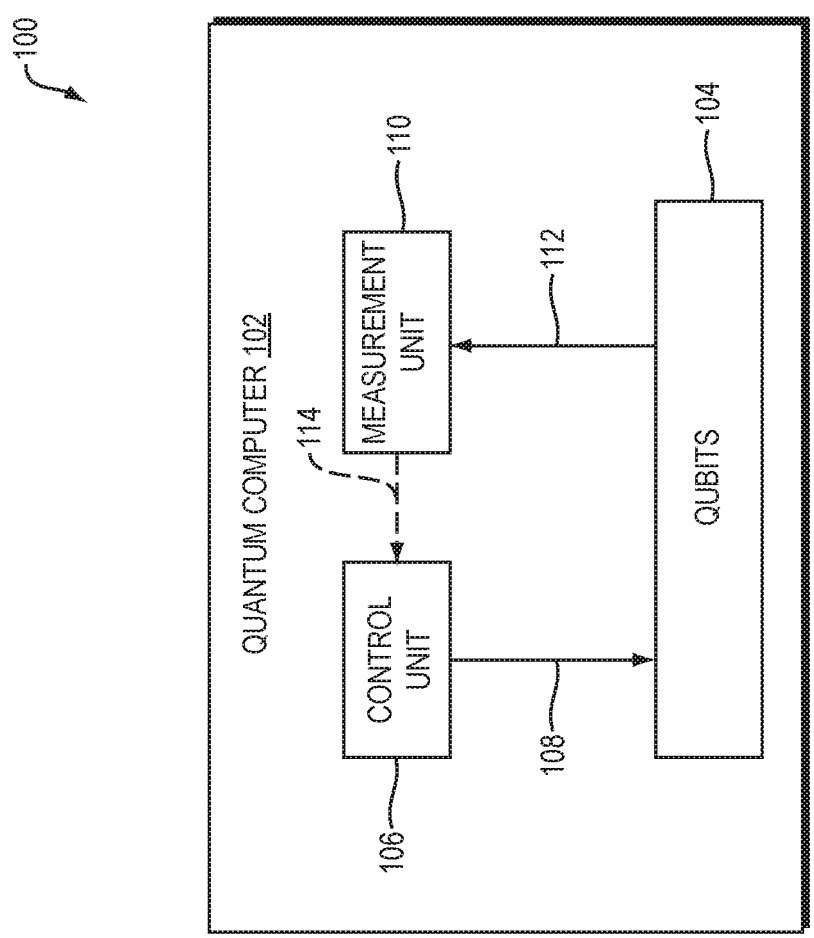
FIG. 1 is a diagram of a quantum computer according to one embodiment of the present invention.

Embodiments of the present invention are directed to a hybrid quantum classical (HQC) computer, which includes both a classical computer component and a quantum computer component, and which implements improvements to the quantum approximate optimization algorithm (QAOA) which enable QAOA to be applied to valuable problem instances (e.g., those including several thousand or more qubits) using near-term quantum computers.

Embodiments of the present invention include systems and methods for increasing the size of implementable quantum optimization algorithms. This is achieved by "packing" a number of effective bits (M) onto the quantum computer which exceeds the number of physical qubits (N). The packing is achieved by defining a set of observables $\{\tilde{Z}_i\}_{i=1}^M$ on N qubits such that the algebraic relationships among them approximately satisfy those of the standard local Pauli-Z observables. Embodiments of the present invention may, for example, incorporate at least some elements of a technique introduced in the following paper to explore the concept of "overlapping qubits": Rui Chao, Ben W Reichardt, Chris Sutherland, and Thomas Vidick, "Overlapping qubits," arXiv preprint arXiv:1701.01062, 2017.

There is a cost to packing the M observables: the $\tilde{Z}_i$ are not algebraically independent. As described in the above-referenced paper entitled "Overlapping Qubits," this penalty prohibits using these packed observables for information storage. For the purposes of combinatorial optimization, however, as long the algebraic relations are sufficiently approximately satisfied, a useful approximate solution can be obtained. This fact underlies the use of standard discrete optimization techniques known as "relaxations". Relaxations entail solving an easier variant of the problem with relaxed constraints, then rounding the (usually) invalid solution back to a valid one. As long as the relaxation is not too severe, the rounded solution is close to the optimal solution.

In applying this technique to QAOA for approximately solving MAXCUT, this relaxation of algebraic independence manifests as distortions in the expectation values $\langle \tilde{Z}_i \tilde{Z}_j \rangle$ for the minimal energy state. The essential insight is that, although this slight distortion is incurred in expectation values, embodiments of the present invention may use classical rounding techniques to recover good approximate solutions to MAXCUT.

FIG. 4 shows an example MAXCUT instance and its solution. Assigning each node to the left or right of the cut leads to some number. In FIG. 4, the MAXCUT score is six, while there are seven edges total.

The quantum approximate optimization algorithm (QAOA), semidefinite relaxation techniques used in combinatorial optimization, the method of line packing in real space, and the algebraic properties of Majorana fermions will now be described.

A quantum algorithm is developed for obtaining approximate solutions to the NP-hard problem of MAXCUT in the following paper: Edward Farhi, Jeffrey Goldstone, and Sam Gutmann, "A quantum approximate optimization algorithm," arXiv preprint arXiv:1411.4028, 2014. As depicted in FIG. 4, the problem is, given a graph G, to assign labels {0,1} to the vertices of the graph so as to maximize the number of edges in G having oppositely-labeled nodes.

Letting A be the adjacency matrix of G with |V|=M vertices, this problem can be cast as the following optimization problem:

$$\max_{z \in \{-1,1\}^M} \frac{1}{2} \sum_{i,j}^M A_{i,j} \frac{1 - z_i z_j}{2} \quad (1)$$

The quantum approximate optimization algorithm described in the above-referenced paper entitled, "A quantum approximate optimization algorithm," aims to tune the parameters of a quantum circuit on M qubits so that the bit strings sampled on the output tend toward better cut assignments. The structure of the quantum circuit is motivated by the quantum adiabatic evolution which transforms the ground state of the trivial Hamiltonian $H_X = -\sum_{i=1}^M X_i$ into the ground state of the target Hamiltonian $H_T = \frac{1}{4}\sum_{i,j} A_{i,j}(1-Z_iZ_j)$. The quantum system is initialized in the ground state of Hx by applying a Hadamard gate $$H = \frac{1}{\sqrt{2}}(X + Z)$$

to each of the qubits $H^{\otimes M}|0\rangle^{\otimes M}$. The structure of the quantum resembles a Trotter approximation to the adiabatic evolution:

$$U(\alpha, \beta) = \prod_{k=1}^L \exp(-i\alpha_k H_X) \exp(-i\beta_k H_T). \quad (2)$$

The circuit parameters may be tuned in a variety of ways.

Note that the number of qubits required for this algorithm is precisely the number of nodes in the graph. In the remainder of the document we describe the tools and techniques for reducing the number of physical qubits with which an operator is represented on the quantum computer. This reduces, for example, the number of physical qubits needed for generating good approximate solutions to MAXCUT. The key observation, derived from the following section, is that it suffices to generate good guesses at the parity expectation values $\mathbb{E}(x_i, x_j)$ in order to obtain good guesses for cut assignments. Method employed by embodiments of the present invention extract good guesses at the parity expectation values using a quantum computer with far fewer than M qubits.

The problem of MAXCUT is NP-hard. Therefore, an algorithm efficiently solving all instances is not expected to exist. Furthermore, it has been shown that obtaining a solution which achieves a MAXCUT score better than a certain fraction of the true optimum is also an NP-hard problem. Nevertheless, approximation algorithms have found widespread application, often achieving high approximation ratios in practice.

The MAXCUT approximation algorithm which achieves the best constant approximation ratio is the Goemans-Williamson algorithm. The Goemans-Williamson algorithm involves two steps: 1) solve a relaxed version of the optimization problems and 2) round the solution back to a valid one. The first step requires re-expressing the optimization problem of Equation 1 as one that is nearly a semidefinite program. This is done as follows. First, Equation 1 is written as an optimization over real vectors with a quadratic constraint:

$$\max_{x \in \mathbb{R}^M} \frac{1}{2} \sum_{i,j}^M A_{i,j} \frac{1 - x_i x_j}{2} \quad (3)$$

$$\text{s.t. } x_i^2 = 1$$

Next, defining $\rho_{ij} = x_i x_j$, which is a rank-one positive semidefinite matrix, rewrite the optimization as:

$$\max_\rho \frac{1}{2}|E| - \frac{1}{4}tr(A\rho) \quad (4)$$

$$\text{s.t. } \rho_{ii}^2 = 1 \quad (5)$$

$$\text{and } \rho \geq 0,$$

$$\text{and } \text{rank}(\rho) = 1,$$

where $|E|$ is the number of edges in G. This optimization task is almost a semidefinite program except that it contains a rank-one constraint. The nonconvexity of this constraint prevents us from using convex optimization directly.

The Goemans-Williamson algorithm first solves the relaxed version of the above optimization, whereby the rank-one constraint is removed and the semidefinite program is carried out. The optimal value of $\rho$ from this semidefinite program is denoted $\rho^*$. The i–jth entry of $\rho^*$ roughly corresponds to the expected parity between nodes i and j, where the value +1 indicates that the two nodes are given the same label, while –1 indicates that the two nodes are given different labels. In the true optimization problem (before the relaxation), the expected values of each parity will be ±1. In the relaxed version, the entries will, in general, lie between these values. Crucially, however, the entries of $\rho^*$ will not correspond to the expected parity values arising from any probability distribution over bit strings. In other words, the parity values expressed in $\rho^*$ are incompatible with one another. This manifests in the fact that $\frac{1}{2}|E| - \frac{1}{4}tr(A\rho^*)$ will be larger than the true MAXCUT score. As an example, in the case of M=3 with G being the complete graph, the MAXCUT value is 2. However, $\rho^*$ will achieve a value of 9/4.

Once the semidefinite programming relaxation is solved, $\rho^*$ is used to generate cut assignments. This is achieved in two steps. First, treating $\rho^*$ as a covariance matrix, generate samples $x \sim \mathcal{N}(0, \rho^*)$ drawn from a zero-centered multivariate Gaussian. Then, round the real-valued entries of these vectors back to ±1 according to $z_i = \text{sign}(x_i)$. Goemans and Williamson show that the expected cut size using this method will be at least $\alpha = 0.878 \ldots$ times the maximum cut size. The constant $\alpha$ is defined by the numerical minimization problem $$\alpha = \min_\theta \frac{2\theta}{\pi(1 - \cos \theta)}.$$

Further work by Khot conjectures that no approximation algorithm can guarantee a better constant-fraction approximation ratio for MAXCUT than $\alpha$, unless P=NP.

With regard to the bit packing method that is used by embodiments of the present invention, one insight to be drawn here is that, with a sufficiently good guess at the parity expectation values (e.g. given by $\rho^*$), even if they are incompatible with one another, the bit packing method can generate good cut assignments with a combination of Gaussian sampling and rounding. Examples of tools used for packing M bits into fewer-than-M qubits so that good parity expectation values can be extracted will now be described.

An underlying technique that embodiments of the present invention may use for packing almost-independent bits into qubits is line packing. The problem of line packing is, given m lines through the origin in n-dimensional space, orient the lines such that the minimal angle among pairs of lines is maximized. A packing is described by a linear transformation from a larger space to a smaller one, such that the angles between vectors in the larger space are approximately preserved under transformation. As an example, given m=4 lines in n=3 dimensional space, the optimal configuration is given by a tetrahedral arrangement of the lines, resulting in a minimal angle between the lines of arccos ($\frac{1}{3}$)≈70.5°. The concept of line-packing is addressed by the Johnson-Lindenstrauss lemma. This lemma roughly states that if a set of lines is allowed to have up to E error in their orthogonality, then one can pack these lines into $$O\left(\frac{\log m}{\epsilon^2}\right)$$

dimensions.

Embodiments of the present invention, however, achieve packings with a higher degree of orthonormality using non-asymptotically optimal (i.e. optimal for a given n and m) packings. The problem of optimally packing m lines in an n-dimensional space has been considered in the following papers: (1) PW Shor and Neil James Alexander Sloane, "A family of optimal packings in grassmannian manifolds," Journal of Algebraic Combinatorics, 7(2):157-163, 1998; and (2) A R Calderbank, R H Hardin, E M Rains, P W Shor, and Neil James Alexander Sloane, "A group-theoretic framework for the construction of packings in grassmannian spaces," Journal of Algebraic Combinatorics, 9(2):129-140, 1999. In particular, this work constructed packings of m=n2+n−2 lines into n dimensions, with explicit error 1/n, which are provably optimal.

The formalism of identical and indistinguishable quantum particles provides an algebraic framework with diverse applications including topological quantum computation and quantum error correction. Such quantum particles are described with a set of operators satisfying a set of so-called canonical commutation relations. These operators are used to describe the dynamics of such interacting particles as well as their properties in thermal equilibrium. A system of M fermions is described using creation and annihilation operators $a^\dagger_i$ and $a_i$ satisfying $$\{a_i, a_j\} = 0 \quad (6)$$

$$\{a_i, a_j^\dagger\} = \delta_{ij} I \quad (7)$$

where $i, j = 1, \ldots, M$. For example, the Hamiltonian of a pair-wise interacting system of fermions is of the form $$H = \sum_{ij} u_{ij} a_i^\dagger a_j + \sum_{ijkl} t_{ijkl} a_i^\dagger a_j a_k^\dagger a_l. \quad (8)$$

Majorana fermions are fermions that are their own antiparticle. Although the existence of fundamental particles behaving as Majorana fermions is still in debate, many condensed matter systems yield quasi-particles obeying Majorana fermion statistics. The Majorana operators are constructed from fermionic creation and annihilation operators $$\gamma_i = \frac{a_i + a_i^\dagger}{\sqrt{2}} \quad (9)$$

$$\gamma_{i+M} = \frac{a_i - a_i^\dagger}{\sqrt{2}\,i}. \quad (10)$$

Thus, a system of M fermions corresponds to a system of 2M Majorana fermions. The canonical commutation relations of the Majorana operators are $$\{\gamma_i,\gamma_j\}=\delta_{ij}I \quad (11)$$

where i,j=1, . . . , 2M.

In the above-referenced paper entitled, "Overlapping qubits," a technique for constructing almost-independent qubits using almost independent Majorana operators is developed. Embodiments of the present invention use a variant of this method for constructing a set of N almost-independent bits. Following [3], the almost-independence of a set of Majorana operators $\{\tilde\gamma_i\}$ is conveyed by their commutation relations approximately satisfying those of Equation 11, $\{\tilde\gamma_i, \tilde\gamma_j\}\approx\delta_{ij}I$. $\{\tilde\gamma_i\}$ is considered to be an approximation of a set of Majorana operators if $$\|\{\tilde\gamma_i,\tilde\gamma_j\}-\delta_{ij}I\|<\epsilon \quad (12)$$

for all i,j. From these almost-independent Majorana operators, a set of almost-independent Pauli-Z operators can be constructed as $$\tilde Z_I = i\tilde\gamma_I(\alpha_I\tilde\gamma_{I+M}+\beta_I\tilde\gamma_I), \quad (13)$$

where $\alpha_I, \beta_I$ are set such that $\beta_I+\alpha_I\Sigma_{i=1}^{2N}P_{I+M}^{\,i}P_I^{\,i}=0$ and $\alpha_I^2+\beta_I^2+2\alpha_I\beta_I\Sigma_{i=1}^{2N}P_{I+M}^{\,i}P_I^{\,i}=1$, ensuring $\tilde Z_I$ is a valid reflection in Hilbert space. These operators inherit the almost-independence from the Majorana operators used to define them.

The set of almost-independent Majorana operators can be used for qubit packing in a general instance of a k-body fermionic Hamiltonian. This is achieved by using the Majorana representation of the fermionic Hamiltonian and replacing each of the Majorana operators with their packed versions. Such packings can be used to reduce the number of qubits used, for example, in quantum algorithms for quantum chemistry including, but not limited to quantum phase estimation and the variational quantum eigensolver. As with the standard approaches to such quantum algorithms, we may choose to represent the fermionic operator to a qubit operator in a number of different ways, including, but not limited to the Jordan-Wigner transformation, the Bravyi-Kitaev transformation, etc.

Figure 7:
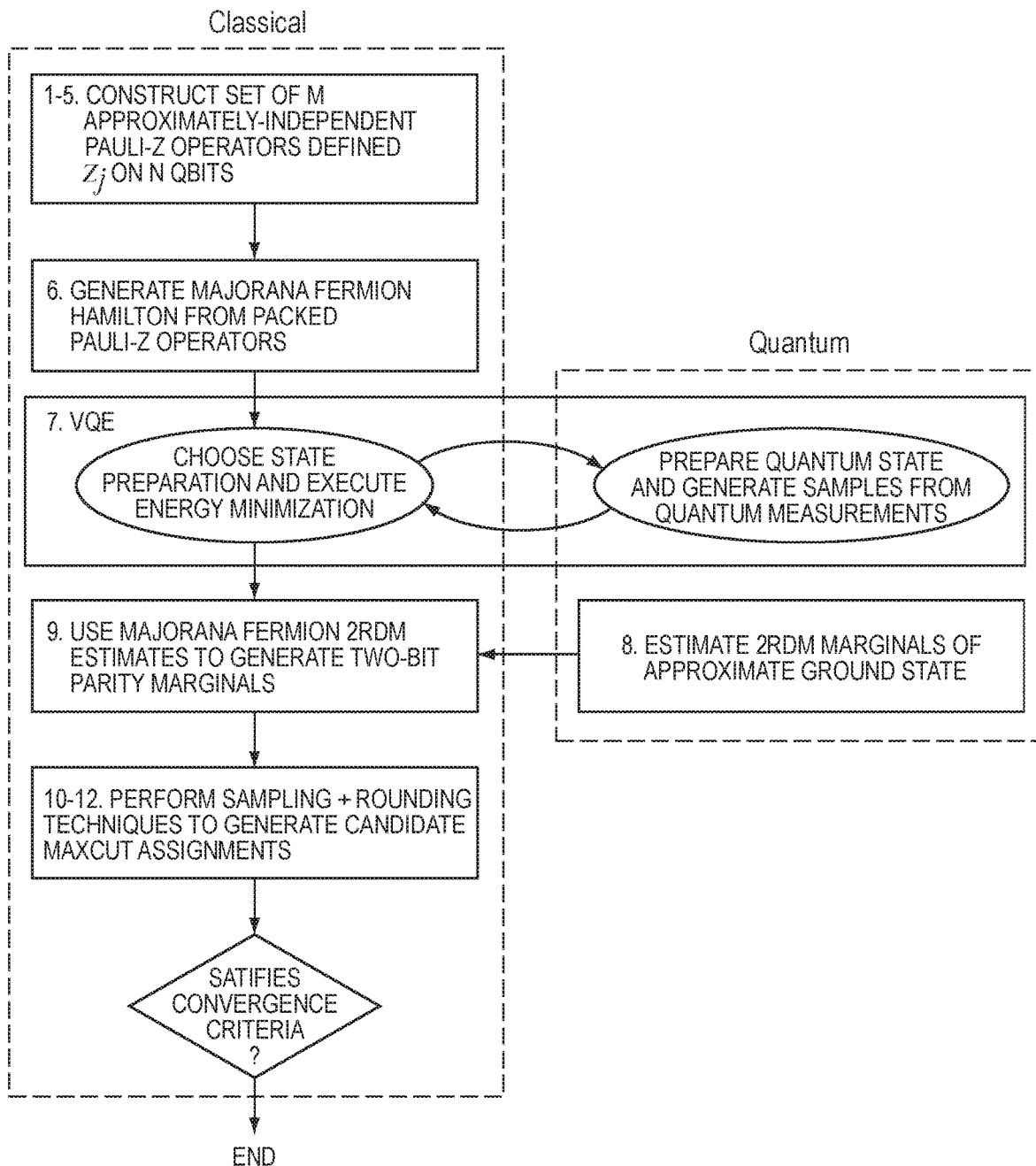
FIG. 7 is a flowchart of a method for generating approximate solutions for MAXCUT according to one embodiment of the present invention.
Figure 8:
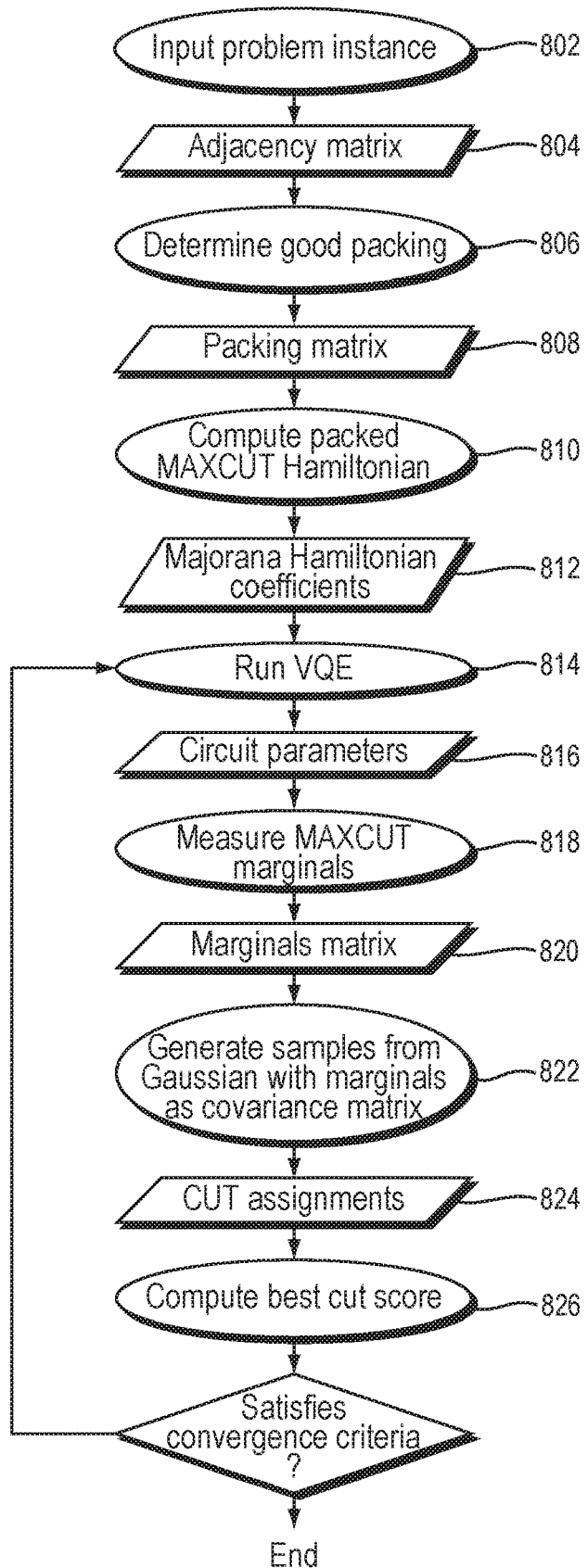
FIG. 8 illustrates a flow of data types from one step to the next in the method of FIG. 7 according to one embodiment of the present invention.

Described next is a qubit packing method used by embodiments of the present invention to generate approximate solutions for MAXCUT. A diagram of the method is given in FIG. 7, where each step is depicted in FIGS. 5 and 6. A flowchart illustrating the flow of data types from one step to the next is shown in FIG. 8. Overall, the method runs the variational quantum eigensolver algorithm on N qubits, whereby the optimal parity expectation values of each MAXCUT graph edge is approximated by measurement statistics of the ground state. With these parity expectation values, classical rounding techniques are used to generate cut assignments. The problem instances can be input as binary clauses, which can be corresponded to an Ising Hamiltonian, or a fermionic Hamiltonian in standard or Majorana form. In the case of a quadratic binary optimization problem, such as MAXCUT, the problem instance can be described by a weighted adjacency graph or matrix A.

Steps 1-5: In steps 1-5, a problem instance is an input, and a set of M approximately-independent Pauli-Z operators defined on N qubits is constructed.

Step 1: In a Stags 802, the problem instance is input, the input graph determines the adjacency graph $A_{ij}$ (Output 804) and the number of nodes M. Each node corresponds to a bit, whereby any boolean vector z corresponds to an assignment of graph nodes to the left (0) and right (1) of the cut.

Steps 2-5: In Steps 2-5, (Stags 806), a packing of M bits into N qubits is determined, with the number of qubits with which the algorithm is carried out denoted by N, where N≤M.

In Step 2, the elementary operators used to construct the N-qubit Hamiltonian are the 2N Majorana operators $\{\gamma_i\}_{i=1}^{2N}$. These operators are mapped to qubit observables using, for example, the Jordan-Wigner transformation $$\gamma_i \to Z_1 \ldots Z_{i-1} X_i \quad (14)$$

$$\gamma_{i+N} \to Z_1 \ldots Z_{i-1} Y_i, \quad (15)$$

Step 3: Next a packing P of 2M lines into 2N dimensions is created, packing 2M almost-orthogonal rays in 2N real dimensions, Step 4: The packing P of 2M lines into 2N dimensions is used to construct 2M almost-independent Majorana operators, $$\tilde\gamma_i = \sum_{i=1}^{2N} P_i^i \gamma_i. \quad (16)$$

with $$\{\tilde\gamma_i, \tilde\gamma_j\} = \left(\sum_{j=1}^{2N} V_i^k V_j^k\right)I = (\delta_{ij} + O(e))I$$

Step 5: The M almost-independent bits are packed into N qubits. Pairs of the Majorana operators (from Step 4), are taken to generate a set of M almost independent Pauli-Z operators, $$\tilde Z_I = i\tilde\gamma_I(\alpha_I\tilde\gamma_{I+M}+\beta_I\tilde\gamma_I), \quad (17)$$

(Output 808), where $\alpha_I, \beta_I$ are set such that $\beta_I+\alpha_I\Sigma_{i=1}^{2N}P_{I+M}^{\,i}P_I^{\,i}=0$ and $\alpha_I^2+\beta_I^2+2\alpha_I\beta_I\Sigma_{i=1}^{2N}P_{I+M}^{\,i}P_I^{\,i}=1$, ensuring $\tilde Z_{i_j}$ is a valid reflection in Hilbert space. It can be checked that $\tilde Z_I^2=I$, $tr(\tilde Z_r)=0$ and that $|[\tilde Z_I,\tilde Z_J]|=\mathcal{O}(\epsilon)$, where $\epsilon$ is the largest inner product of the packed real vectors in P.

Step 6: With the set of packed Pauli-Z operators defined, the MAXCUT Hamiltonian is decomposed into a two-body Majorana fermion Hamiltonian (STAGE 810, output 812)

$$H = -\sum_{ij} A_{ij} \tilde{Z}_i \tilde{Z}_j \quad (18)$$

$$= \sum_{ij} A_{ij} \tilde{\gamma}_i \tilde{\gamma}_i + M \tilde{\gamma}_j \tilde{\gamma}_j + M \quad (19)$$

$$= \sum_{ij}^{M} \sum_{abcd}^{2N} A_{ij} V_a^i V_b^{j+M} V_c^j V_d^{j+M} \gamma_a \gamma_b \gamma_c \gamma_d. \quad (20)$$

Step 7: The variational quantum eigensolver (VQE) algorithm is used (Stage 814) to approximately prepare the ground state of H, determining variational circuit parameters (Output 816) which prepare this state.

Step 8: Using the state prepared with these parameters, the two-RDMs of the Majorana fermion Hamiltonian are estimated using standard methods either on a quantum computer by measuring the qubits or on a classical computer by classical simulation of the quantum system (Stag. 818)

$$\left\langle \tilde{\gamma}_a \tilde{\gamma}_b \tilde{\gamma}_c \tilde{\gamma}_d \right\rangle_{|\psi_{gs}\rangle}. \quad (21)$$

Step 9: The estimated two-RDMs of the Majorana fermion Hamiltonian are combined (Stage not shown in FIG. 8) to give estimates of the parity expectation values $$\mu_{I,J} = \sum \left\langle \tilde{\gamma}_a \tilde{\gamma}_b \tilde{\gamma}_c \tilde{\gamma}_d \right\rangle_{|\psi_{gs}\rangle}. \quad (22)$$

thus creating the so-called marginal matrix μ (Output 820)

Step 10-12: Generating MAXCUT assignments from marginal data. The MAXCUT assignments are generated from marginal data as follows:

Step 10: The so-called marginal matrix p is minimally made positive semidefinite (Stag. 822, part 1), by adding an identity matrix scaled by the minimal eigenvalue of μ, $$\bar{\mu} = \mu - \lambda_0 I, \quad (23)$$

where $\lambda_0$ is the minimal eigenvalue of μ, resulting in the minimal eigenvalue of $\bar{\mu}$ being zero.

Step 11: The marginal matrix $\bar{\mu}$ is used to generate samples for cut assignments as follows. Generate samples (Stage 822, part 2), x~$\mathcal{N}(0,\bar{\mu})$, where $\mathcal{N}$ is the multivariate Gaussian distribution with zero-mean and covariance matrix $\bar{\mu}$ (Output 824).

Step 12: Round each sample vector to generate bit strings z=sign(x). Compute the cut score of each bit string z (Stage 826), taking the maximal value $z_{max}$ as the approximation to the MAXCUT score. Additionally, the average cut score may be taken as a cost function used to drive further rounds of VQE.

In the case of Hamiltonians constructed from Ising operators, we can alternatively use a packing of N 2-planes into a 2M-dimensional space. We replace Steps 3-5 above with the following:

Step 3: Next a packing P of M planes into 2N dimensions is created, packing M almost-orthogonal planes in 2N real dimensions, Step 4: The packing P of M planes into 2N dimensions is used to construct M almost-independent Majorana operator pairs, $$\tilde{Z}_I = i \tilde{\gamma}_I \tilde{\gamma}_{I+M}$$

Where $$\tilde{\gamma}_{2I} = \sum_a P_{2I}^a \gamma_a$$

and $$\tilde{\gamma}_{2I+1} = \sum_a P_{2I+1}^a \gamma_a,$$

with the 2I and 2I+1 columns of P corresponding to a pair of unit vectors spanning the Ith plane.

(##)

There are numerous ways in which the packings P can be generated. Stochastic packings can be generated using the standard method of Johnson-Lindenstrauss, whereby each entry of P is drawn from a zero-centered Gaussian distribution with unit variance. A compendium of explicit packings (i.e. not stochastically derived) can be found on the website http://neilsloane.com/grass/grassTab.html. The packings described therein include, but are not limited to, packings derived from:

- numerical searching
- classical error correcting codes (e.g. Hadamard code)
- symmetric conference matrices
- skew symmetric conference matrices Variations on embodiments of the present invention include, for example, direct application to weighted MAX-CUT, employing a low-rank decomposition of the Hamiltonian tensor to decrease the number of measurement shots needed to achieve a desired accuracy of each Pauli expectation, using techniques for increasing the statistical power of expectation value estimation, and using rounding techniques that apply beyond MAXCUT Hamiltonian to apply the bit packing technique more broadly. For example, the variational quantum factoring algorithm (described in Eric R Anschuetz, Jonathan P Olson, Alan Aspuru-Guzik, and Yudong Cao, "Variational quantum factoring," arXiv preprint arXiv:1808.08927, 2018) employs a Hamiltonian with four-body Pauli-Z terms. Rounding techniques for the marginals derived from such cases would enable the qubit packing method to be applied.

Figure 9:
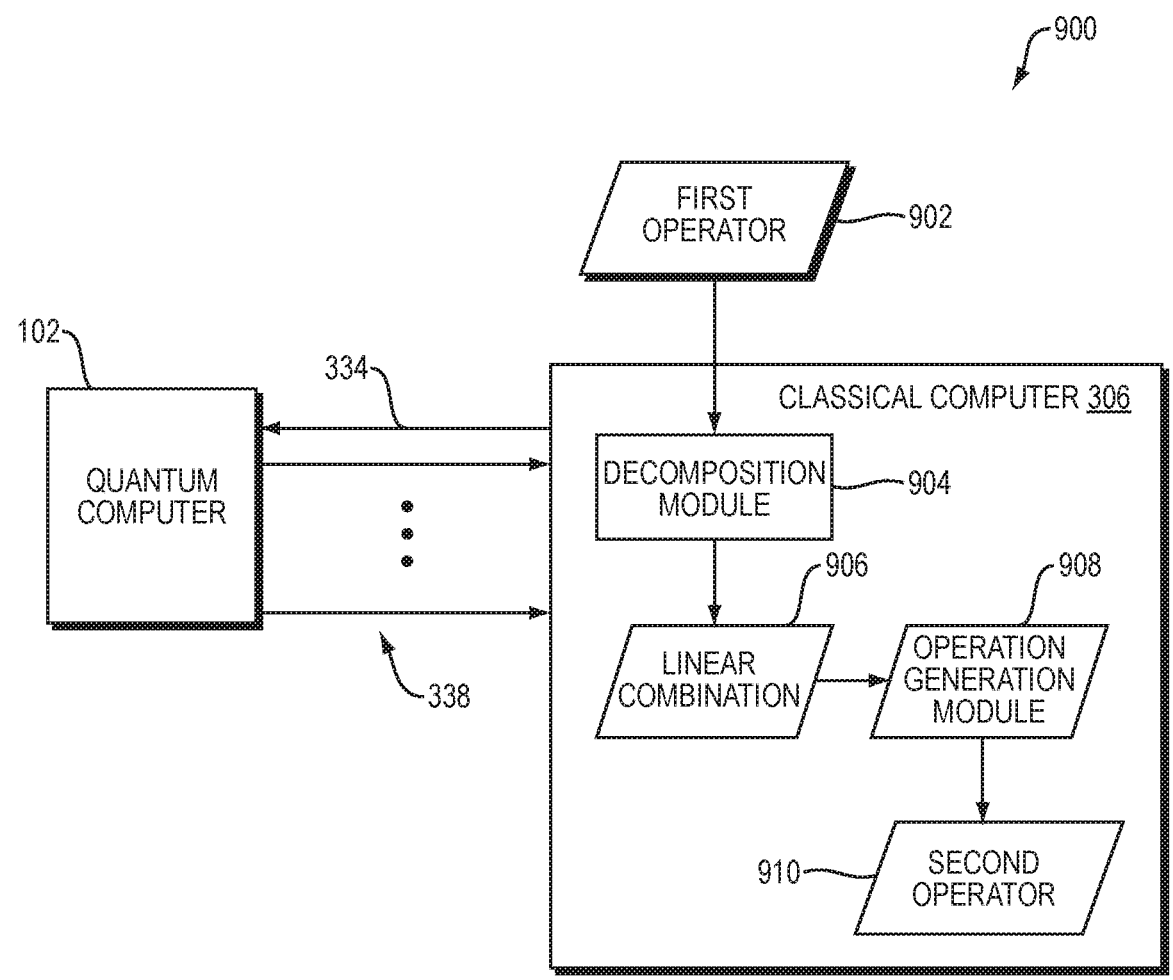
FIG. 9 is a dataflow diagram of a system for reducing the number of qubits with which an operator is represented on a quantum computer according to one embodiment of the present invention.
Figure 10:
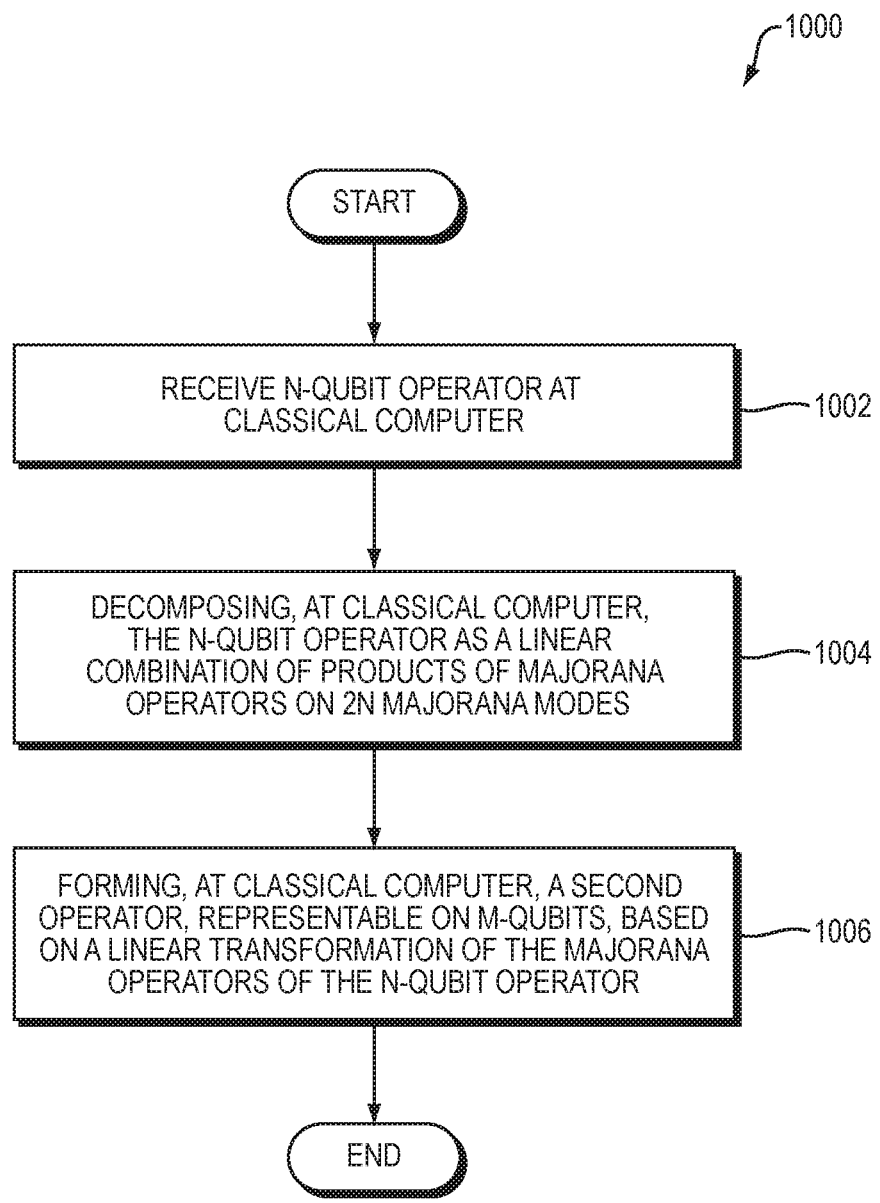
FIG. 10 is a flowchart of a method performed by the system of FIG. 9 according to one embodiment of the present invention.

Referring to FIG. 9, a dataflow diagram is shown of a system 900 for reducing the number of qubits with which an operator is represented on the quantum computer 102 according to one embodiment of the present invention. Referring to FIG. 10, a flowchart is shown of a method 1000 performed by the system 900 of FIG. 9 according to one embodiment of the present invention. The method 1000 includes: (1) receiving, as input, at the classical computer 306, an N-qubit operator 902 (FIG. 10, operation 1002); (2) decomposing, at a decomposition module 904 in the classical computer 306, the N-qubit operator 902 as a linear combination 906 of products of Majorana operators on 2N Majorana modes (FIG. 10, operation 1004); (3) forming, at an operation generation module 908 on the classical computer 306, a second operator 910, representable on M qubits, based on a linear transformation of the Majorana operators 906 of the N-qubit operator 902, wherein the linear transformation is from R^(2N) to R^(2M), wherein M<N (FIG. 10, operation 1006).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of B orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
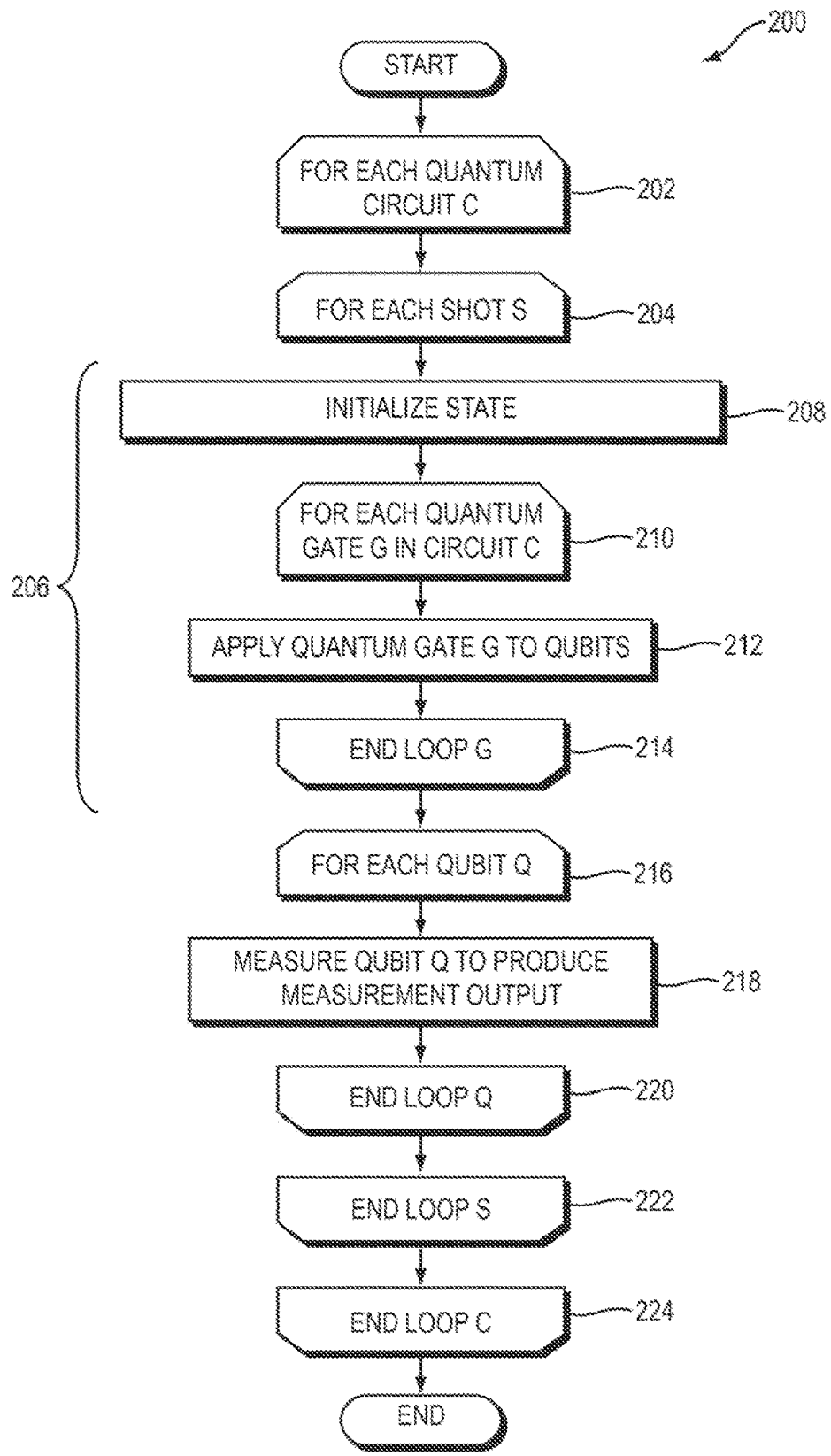
FIG. 2A is a flowchart of a method performed by the quantum computer of FIG. 1 according to one embodiment of the present invention.
Figure 2B:
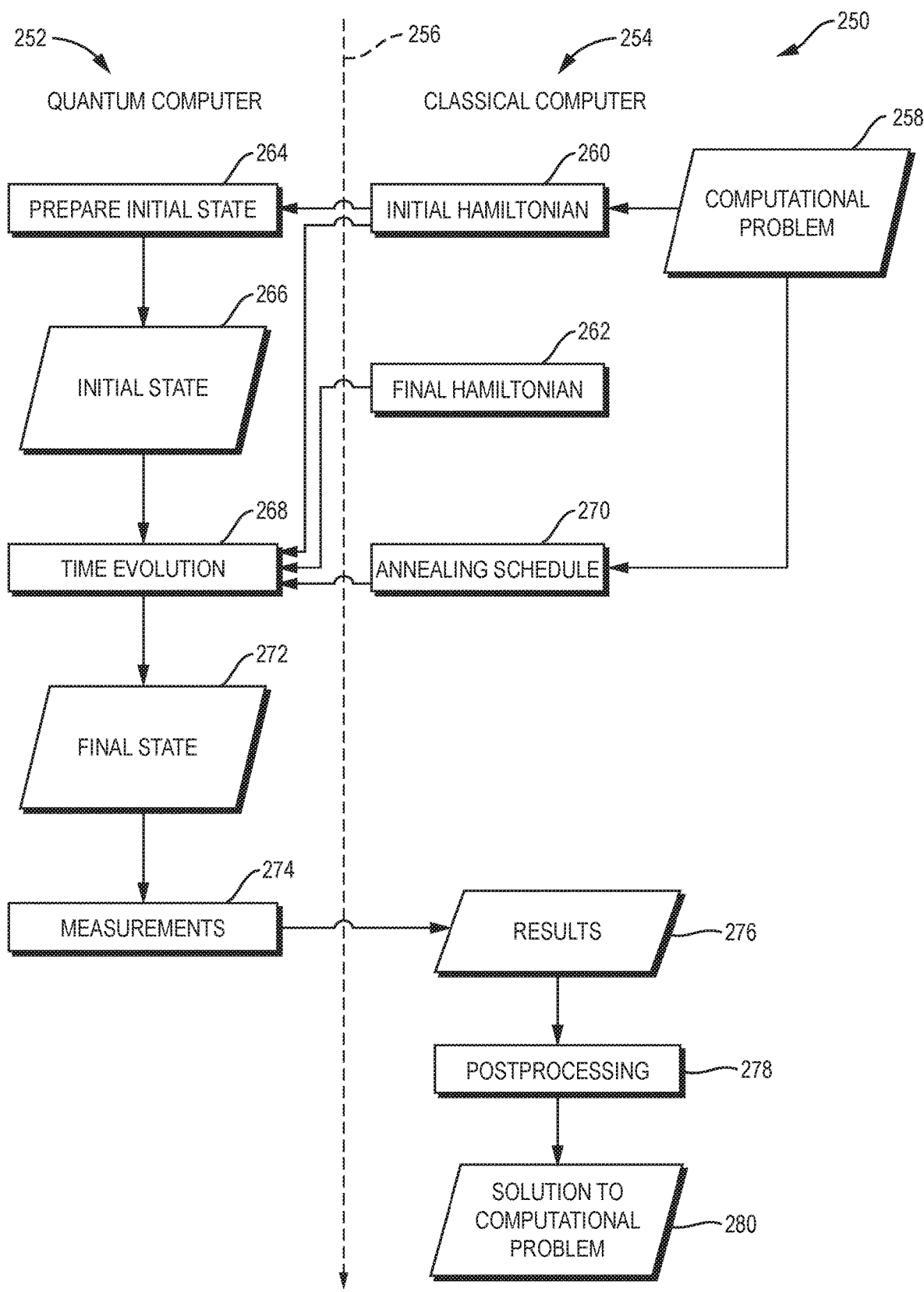
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final. Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
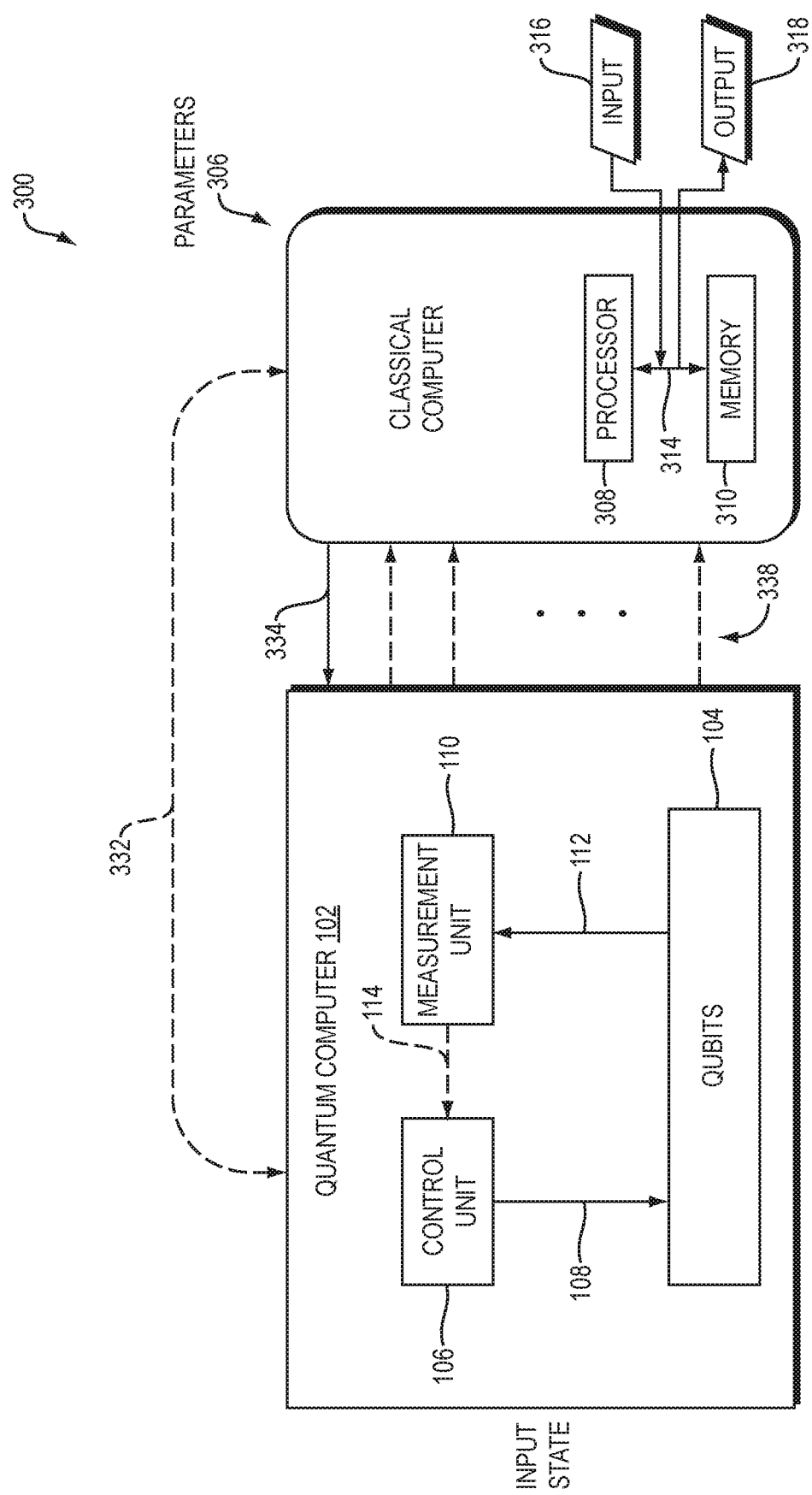
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually, especially when applied to problem instances having large numbers of qubits (e.g., greater than 10, 50, 100, 500, or 1000 qubits). For example, embodiments of the present invention implement the quantum approximate optimization algorithm (QAOA), which is a quantum algorithm which is implemented on a quantum computer. Such an algorithm cannot be performed mentally or manually and therefore is inherently rooted in computer technology generally and in quantum computer technology specifically.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for reducing the number of qubits with which an operator is represented on a quantum computer, the method comprising:
   (1) receiving, as input, at a classical computer, an N-qubit operator;
   (2) decomposing, at the classical computer, the N-qubit operator as a linear combination of products of Majorana operators on 2N Majorana modes;
   (3) forming, at the classical computer, a second operator, representable on M qubits, based on a linear transformation of the Majorana operators of the N-qubit operator, wherein the linear transformation is from $R^{\wedge}(2N)$ to $R^{\wedge}(2M)$, wherein M<N.

2. The method of claim 1, further comprising:
   (4) at the quantum computer, generating marginal expectation values from the packed operator; and
   (5) at the classical computer, using the marginal expectation values to generate approximate marginals by approximating an expectation value of the operator.

3. The method of claim 2, further comprising:
   (6) generating bit string samples based on the approximate marginals.

4. The method of claim 2, wherein the input operator comprises an Ising Hamiltonian.

5. The method of claim 4, further comprising:
   (6) generating bit string samples based on the approximate marginals.

6. The method of claim 5, wherein generating the bit string samples comprises generating the bit string samples by generating samples and then rounding.

7. The method of claim 5, wherein generating the bit string samples comprises generating the bit string samples using direct rounding.

8. The method of claim 4, wherein forming the second operator based on the linear transformation comprises performing a packing of 2-planes.

9. The method of claim 8, wherein performing the packing of 2-planes comprises performing skew-symmetric conference matrices.

10. The method of claim 8, wherein performing the packing of 2-planes comprises performing numerically-generated semidefinite programming packings.

11. The method of claim 1, wherein the input operator comprises a fermionic Hamiltonian.

12. The method of claim 1, wherein the input operator comprises an ising Hamiltonian.

13. The method of claim 1, wherein the linear transformation comprises a stochastic transformation.

14. The method of claim 13, wherein the stochastic transformation comprises a Johnson-Lindenstrauss transformation.

15. The method of claim 1, wherein the linear transformation comprises an explicit transformation.

16. The method of claim 15, wherein the explicit transformation comprises Hadamard codes.

17. The method of claim 15, wherein the explicit transformation comprises symmetric conference matrices.

18. A system comprising:
    a classical computer including a processor, a non-transitory computer-readable medium, and computer program instructions stored in the non-transitory computer-readable medium;
    a quantum computer comprising a plurality of qubits;
    wherein the computer program instructions, when executed by the processor, perform a method for reducing the number of qubits with which an operator is represented on the quantum computer, the method comprising:
    (1) receiving, as input, at a classical computer, an N-qubit operator;
    (2) decomposing, at the classical computer, the N-qubit operator as a linear combination of products of Majorana operators on 2N Majorana modes;
    (3) forming, at the classical computer, a second operator, representable on M qubits, based on a linear transformation of the Majorana operators of the N-qubit operator, wherein the linear transformation is from $R^{\wedge}(2N)$ to $R^{\wedge}(2M)$, wherein M<N.

19. The system of claim 18, wherein the method further comprises:
    (4) at the quantum computer, generating marginal expectation values from the packed operator; and
    (5) at the classical computer, using the marginal expectation values to generate approximate marginals by approximating an expectation value of the operator.

20. The system of claim 19, wherein the method further comprises:
    (6) generating bit string samples based on the approximate marginals.

21. The system of claim 19, wherein the input operator comprises an Ising Hamiltonian.

22. The system of claim 21, wherein the method further comprises:
    (6) generating bit string samples based on the approximate marginals.

23. The system of claim 22, wherein generating the bit string samples comprises generating the bit string samples by generating samples and then rounding.

24. The system of claim 22, wherein generating the bit string samples comprises generating the bit string samples using direct rounding.

25. The system of claim 21, wherein forming the second operator based on the linear transformation comprises performing a packing of 2-planes.

26. The system of claim 25, wherein performing the packing of 2-planes comprises performing skew-symmetric conference matrices.

27. The system of claim 25, wherein performing the packing of 2-planes comprises performing numerically-generated semidefinite programming packings.

28. The system of claim 18, wherein the input operator comprises a fermionic Hamiltonian.

29. The system of claim 18, wherein the input operator comprises an ising Hamiltonian.

30. The system of claim 18, wherein the linear transformation comprises a stochastic transformation.

31. The system of claim 30, wherein the stochastic transformation comprises a Johnson-Lindenstrauss transformation.

32. The system of claim 18, wherein the linear transformation comprises an explicit transformation.

33. The system of claim 32, wherein the explicit transformation comprises Hadamard codes.

34. The system of claim 32, wherein the explicit transformation comprises symmetric conference matrices.

* * * * *